(12) United States Patent
Stickles et al.

(10) Patent No.: US 10,766,424 B2
(45) Date of Patent: Sep. 8, 2020

(54) RADIO FREQUENCY CONTROL SYSTEM FOR POWER RUNNING BOARDS

(71) Applicant: Bestop, Inc., Louisville, CO (US)

(72) Inventors: George C. Stickles, Thornton, CO (US); Frank A. Borke, Greeley, CO (US)

(73) Assignee: Bestop, Inc., Louisville, CO (US)

( * ) Notice: Subject to any disclaimer, the term of this patent is extended or adjusted under 35 U.S.C. 154(b) by 70 days.

(21) Appl. No.: 15/953,066

(22) Filed: Apr. 13, 2018

(65) Prior Publication Data

US 2018/0297530 A1   Oct. 18, 2018

Related U.S. Application Data

(60) Provisional application No. 62/485,199, filed on Apr. 13, 2017.

(51) Int. Cl.

| | |
|---|---|
| *B60R 3/02* | (2006.01) |
| *B60R 16/03* | (2006.01) |
| *G05D 3/20* | (2006.01) |
| *G08C 17/02* | (2006.01) |
| *B60R 3/00* | (2006.01) |
| *B60R 16/033* | (2006.01) |

(52) U.S. Cl.
CPC .............. *B60R 3/02* (2013.01); *B60R 3/002* (2013.01); *B60R 16/03* (2013.01); *B60R 16/033* (2013.01); *G05D 3/20* (2013.01); *G08C 17/02* (2013.01); *G08C 2201/51* (2013.01)

(58) Field of Classification Search
USPC ......................................................... 701/49
See application file for complete search history.

(56) References Cited

U.S. PATENT DOCUMENTS

| | | | |
|---|---|---|---|
| 8,602,431 B1 | 12/2013 | May | |
| 8,833,782 B2 | 9/2014 | Huotari et al. | |
| 2012/0098231 A1* | 4/2012 | Huotari | B60R 3/02 280/166 |
| 2015/0094877 A1* | 4/2015 | Tahnoose | G07C 5/008 701/1 |
| 2015/0123374 A1* | 5/2015 | Smith | B60R 3/02 280/166 |
| 2016/0023609 A1* | 1/2016 | Watson | B60R 3/02 280/166 |
| 2017/0200335 A1* | 7/2017 | Da Deppo | G07C 9/00309 |
| 2018/0297530 A1* | 10/2018 | Stickles | B60R 3/02 |

* cited by examiner

*Primary Examiner* — Tyler D Paige (74) *Attorney, Agent, or Firm* — Warn Partners, P.C.

(57) ABSTRACT

A control system incorporated with a power running board assembly. In particular, incorporating a radio frequency control system for a retractable power running board assembly to move the assembly between a stowed or retracted position and a deployed or extended position. The present invention uses a transmit/acknowledge scheme of door transceivers and receivers to reduce transmissions necessary to monitor door status changes and operation of the retraction and deployment of the running board, which significantly reduces the number of transmissions and wear on the door transceivers battery to extend battery lifetime.

20 Claims, 7 Drawing Sheets

RADIO FREQUENCY CONTROL SYSTEM FOR POWER RUNNING BOARDS

CROSS-REFERENCE TO RELATED APPLICATIONS

The instant application is a non-provisional of 62/485,199, filed Apr. 13, 2017. The disclosures of the above application are incorporated herein by reference.

FIELD OF THE INVENTION

The present invention relates to a system used to actuate a device such as a retractable vehicle step assembly or power running board assembly based on a predetermined condition of the vehicle, such as door open or door closed status.

BACKGROUND OF THE INVENTION

Static running boards are known to those skilled in the art. These steps are added to vehicles to provide a side step surface into a cab, but they do not retract out of the way when not in use.

Current electrical steps are also known to those skilled in the art. These step systems are added to vehicles in production and in the aftermarket to provide a step which folds down when a passenger or driver enters the vehicle. The step also retracts and is more hidden out of the way when not in use. Electrical steps or drop-down running boards for vehicles are generally known, and are most commonly used for sport utility vehicles and pick-up trucks, which sit higher off of the ground compared to a car. Drop-down running boards move between a retracted position when the vehicle doors are closed and a deployed position when one or more of the vehicle doors is opened.

Typical drop-down running boards are activated by a signal received by the vehicle's computer indicating that one or more of the doors are open. The signal is typically the vehicle's "door ajar" signal. Each drop-down running board is activated separately from one another, based on which side of the vehicle has an open door.

Typical vehicle electrically retractable steps require a wireless signal to retract/extend the step, where the wireless signal transmits a redundant signal. This adds to the wear on the battery.

Some systems monitor door status switches for whether or not the doors are open. Only when a door is open will the status be transmitted to a receiver, typically, a delayed transmission, and monitoring door status is continued. This current transmitter process depletes battery life. Current systems transmit about six times or more per second with a signal or "I'm alive" or "door is open" signal using power from the battery constantly while a condition is maintained, such as while the vehicle door is left open.

Therefore, there remains a need in the art to provide an articulating power running board that operates with a transmitting scheme for extending battery lifetime.

SUMMARY OF THE INVENTION

A control system incorporated with power running boards for vehicles is provided. In particular, a radio frequency control system for a retractable power running board to move between a stowed or retracted position and at least one deployed or extended position. The present invention uses a transmit/acknowledge scheme that minimizes the number of transmissions to accomplish the monitoring of the "door ajar" for operation of the retracting/extending of the step, which significantly reduces the number of transmissions and wear on the battery to extend battery lifetime. Through using the transmission/acknowledgment scheme, door transceivers do not need to transmit an "I'm alive/open/door ajar" signal the entire duration the vehicle door is open. Since constant transmission of redundant status information is conventionally powered by batteries; the present invention allows for eliminating the constant drain on the batteries by significantly reducing transmissions. Optionally, there is provided a power running board system that additionally has current spike detection for override to prevent damage to the running board. The present invention is adaptable for use on sport utility vehicles and pick-up trucks or any other vehicle type generally having higher ground clearance where a step up into the vehicle, cab or truck bed is desired.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring to the Figures generally, the signal transmissions could be reduced to as few as two with the transmit/acknowledge scheme used according to the present invention. According to the present invention, there is an extension of the battery lifetime/ease of use. Optionally, additional features include any one of the following and combinations thereof: increasing the number of batteries on board to increase capacity; providing a battery that is more easily replaceable; using a suitably sized current limiting resistor and a storage capacitor to reduce the instantaneous current draw on the battery; replacing the transmitting section on the board with a lower current transmitter; reducing the transmission frequency; and/or changing communication schemes reducing transmission frequency.

Figure 1:
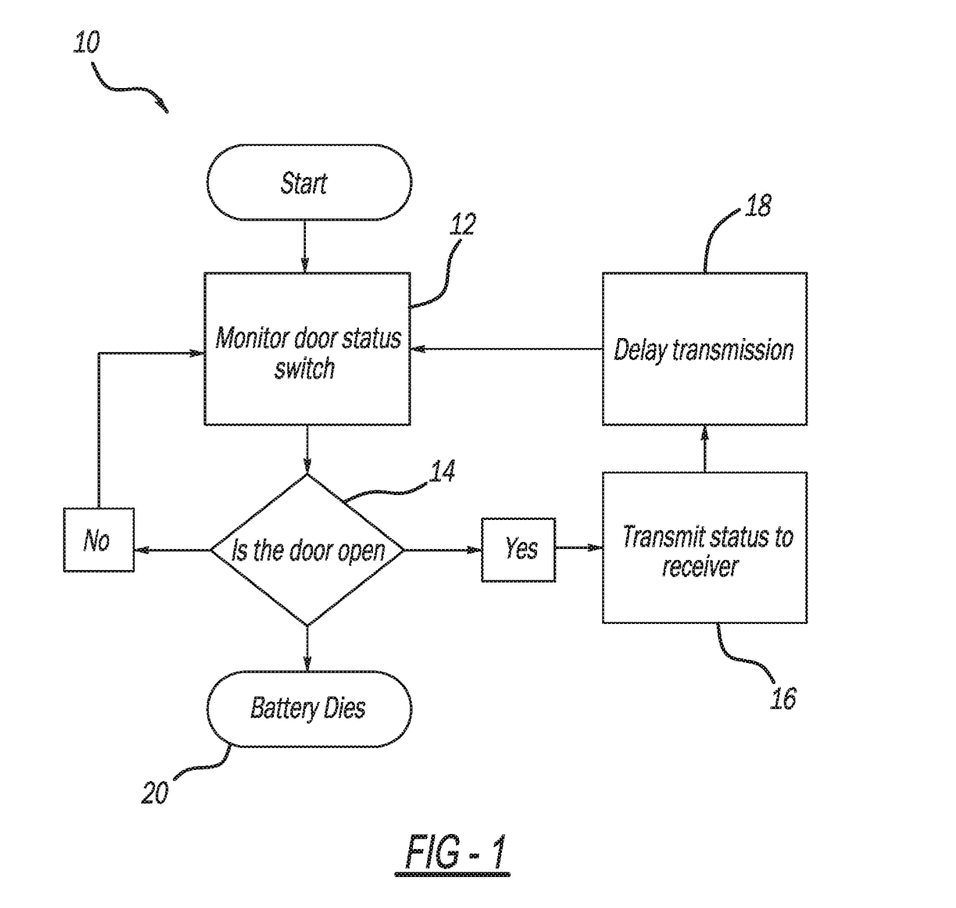
FIG. 1 is a flow chart of a current system that transmits about 6 times per second with an "I'm alive" signal using power from the battery constantly while the door is open.

FIG. 1 is a flow chart of a current transmitter process generally shown at 10 that transmits about 6 times or more per second with an "I'm alive" signal using power from the battery constantly while the door is open. This process requires a signal that is a redundant signal, which is problematic due to battery wear and other issues. The door status switch is monitored 12. If it is determined that at least one door is open 14, the status is transmitted to the receiver 16. The transmission is typically a delayed transmission, e.g., 150 milliseconds, as indicated at 18. If it is determined that at least one door is not opened 14, the door status switch is monitored 12. Constantly signaling depletes power from the battery until the battery dies, indicated at 20.

When compared to the current transmitter scheme battery life can be extended greatly. A battery, by its nature, will self-discharge over time so the numbers in Table 1 are only calculated in comparison to the current system with a 3 year lifetime. As calculated, the battery lifetime is extended greatly. This does not take into account the power capacity saved by not stressing the battery chemistry in the current design.

Table 1 shows that as the door open time increases with the current system, the transmit cycles increase from 89 to 1773 and the battery life decreases from 4.92 to 0.007 years. In stark contrast, as the door open time increases with the present invention, the transmit cycles and the battery life remain the same. Even at the lowest average door open time, the current system has many more transmit cycles (89) and much lower battery life (4.932 years) as compared to the present invention having 2 transmit cycles and a battery life of 8.126 years no matter how long the average door open time.

TABLE 1

| Average Door Open Time In Seconds | Average Door Open Time in (minutes) | Current System Transmit Cycles at 21 m/s Each | Current Total Life of Battery in Years | New Tx/Ack Scheme Cycles at 21 m/s Each | Total Battery Life With Tx/Ack Program in Years |
|---|---|---|---|---|---|
| 15 | 0.25 | 89 | 4.932 | 2 | 8.126 |
| 30 | 0.50 | 177 | 2.192 | 2 | 8.126 |
| 60 | 1.00 | 355 | 0.959 | 2 | 8.126 |
| 90 | 1.50 | 532 | 0.548 | 2 | 8.126 |
| 120 | 2.00 | 709 | 0.411 | 2 | 8.126 |
| 150 | 2.50 | 887 | 0.274 | 2 | 8.126 |
| 180 | 3.00 | 1064 | 0.137 | 2 | 8.126 |
| 210 | 3.50 | 1241 | 0.078 | 2 | 8.126 |
| 240 | 4.00 | 1418 | 0.034 | 2 | 8.126 |
| 270 | 4.50 | 1596 | 0.015 | 2 | 8.126 |
| 300 | 5.00 | 1773 | 0.007 | 2 | 8.126 |

Figure 2:
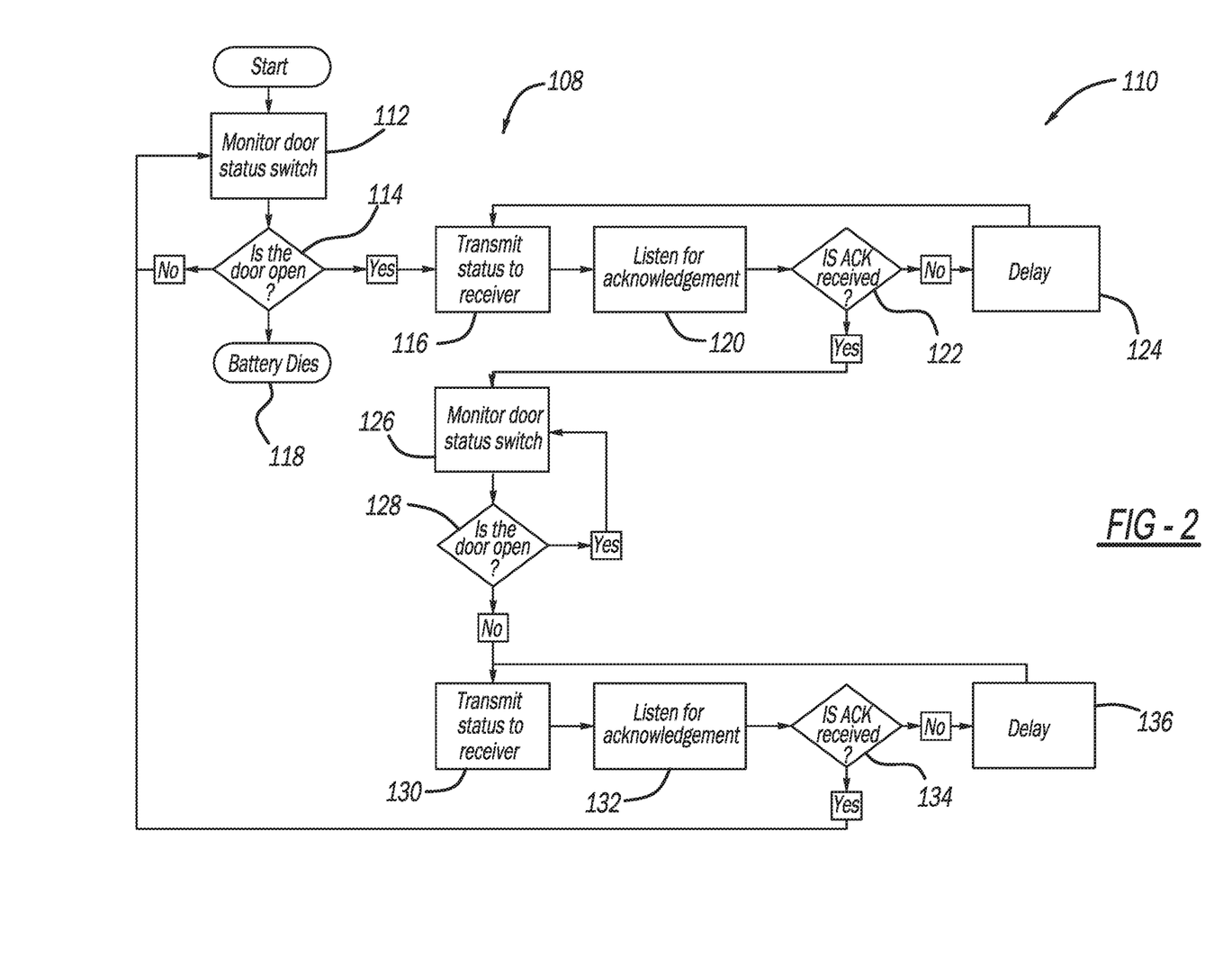
FIG. 2 is a flow chart depicting a control system including a transmit/acknowledge scheme, in accordance with the present invention.

Referring to FIG. 2, generally, there is depicted a flow chart illustrating a door transceiver operation including a transmit/acknowledge feature, shown generally at 108, as part of a control system, indicated generally at 110, in accordance with the present invention. Preferably, the control system 110 is a radio frequency control system, most preferably, a radio frequency control system integrated with a power running board assembly. The control system 110 utilizes the transmit/acknowledge scheme 108 that allows a predetermined minimum of transmissions to accomplish the same thing as conventional systems which required more transmissions and drains battery life. Preferably, the transmit/acknowledge scheme allows two transmissions to accomplish the same thing.

It is understood that there could be times where the transmitter needs to send more than once due to interference between other transmitters, in which case, delaying the transmission may be desired. The delays in the transmission can be delayed to make sure the receiver and transmitters are communicating clearly without depleting as much battery life and affecting the user's need to change batteries. Thus, the radio frequency control system using transmit and acknowledge according to the present invention is advantageous and superior over any redundant signaling feature.

Table 1 illustrates a current transmitter scheme (including columns "Current System Transmit Cycles at 21 m/s Each" and "Current total Life Battery in Years") and the improvement in extending battery life using the present invention.

Referring to 2 to 6 generally, and more particularly now to FIG. 2, the transmit/acknowledgement 108 of the control system 110 according to the present invention includes first monitoring at least one door status switch 112. The status of the door being open is determined 114. If at least one door is open, the door status is transmitted to the receiver 116. If it is determined that at least one door is not open, monitoring the door status switch 112 continues. At some point, the battery eventually dies, indicated at 118 (e.g., after at least 8 years of use).

After transmitting door status to the receiver 116 (e.g., receiver 332 of FIG. 7), the system listens for acknowledgement at 120 back. The status of the acknowledgement being received is determined 122. If acknowledgment is not received, there is a predetermined delay time 124, e.g., about 150 m/s, before transmitting door status to the receiver 116 again.

If acknowledgement is received, the system continues monitoring the door status switch 126. The status of the door being open is determined 128. If open, then monitoring the door status switch 126 continues. If not open, the door status is transmitted to the receiver 130.

After transmitting door status to the receiver 130, the system listens for acknowledgement at 132 back. The status of the acknowledgement being received is determined 134. If acknowledgment is not received, there is a predetermined delay time 136, e.g., about 150 m/s, before transmitting door status to the receiver 130 again. If acknowledgement is received, the system goes back to monitoring the door status switch at 112.

Figure 7:
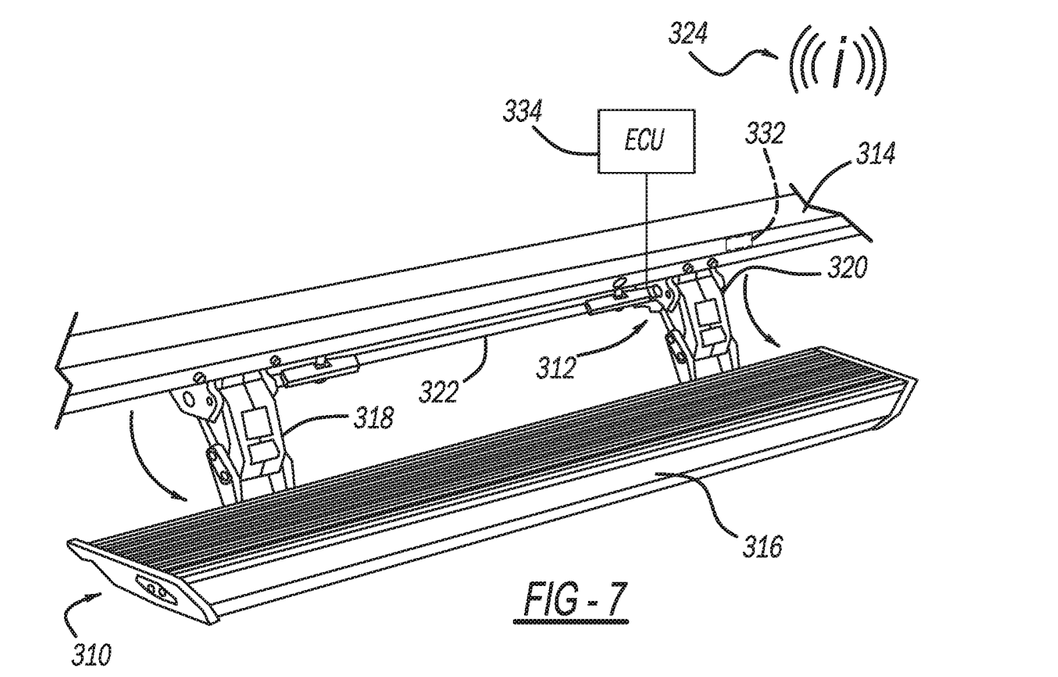
FIG. 7 is a perspective view of an exemplary power running board assembly incorporating the control system, in accordance with the present invention.

Most preferably, the control system 110 is incorporated with, a power running board assembly for a vehicle, most preferably, a drop-down running board (e.g., such as shown generally at 310 in FIG. 7). An exemplary drop-down running board is described in U.S. Pat. No. 8,833,782, which is incorporated herein by reference. The running board is operably mounted to the vehicle and incorporates the control system 110 utilizing the transmit/acknowledgement scheme for extending battery life compared to conventional systems.

Figure 8:
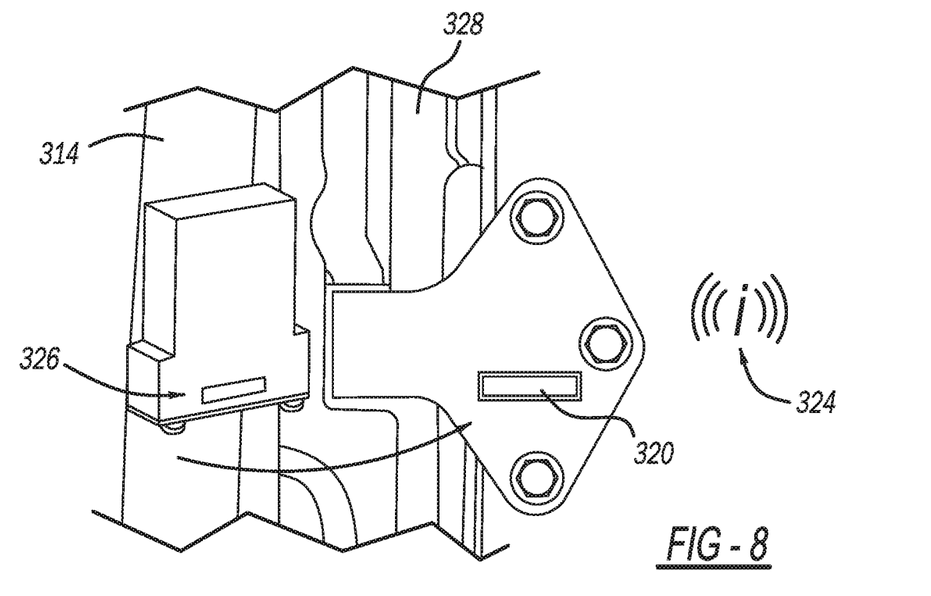
FIG. 8 is a side elevation view a transceiver unit and door sensor coupled to a vehicle, in accordance with the present invention.

Preferably, the power running board assembly, e.g., such as shown generally at 310 in FIG. 7, is electronically actuated by an electrical motor assembly, indicated generally at 312, from a stowage or retracted position generally tucked up under the vehicle 314 to a deployed or extended position (such as shown in FIG. 7). However, it is to be readily appreciated that other methods of actuation of the step portion of the assembly is within the scope of the present invention such as hydraulic, pneumatic or other motors or actuation cylinders. Preferably at least one battery is used to supply power to the electrical motor assembly 312. At least one linkage assembly is provided with a mounting portion to attach a running board 316 or step to the vehicle. Preferably two linkage assemblies are used. The linkage assemblies also support the running board 316 and movement of the links of the linkage assembly retracts/extends the running board. The linkages preferably include at least one first link 318 (e.g., idler link) and at least one second link 320 (e.g., drive link) coupled to at least one torsion bar 322. Preferably at least one controller for processing signals, generally shown at 324, is also provided for signaling (e.g., FIG. 8 shown generally at 324, causes triggering the motor 312 to actuate the links to selectively retract/extend. Preferably a receiver is also provided.

According to an embodiment of the present invention, at least one sensor and/or switch is provided in a predetermined location suitable to monitor condition(s) such as the vehicle door is open. Typically at least one proximity type sensor is used, e.g., on two or more linkages, door switch, etc. However, it is to be readily appreciated that any other sensors are within the scope of the present invention such as magnetic sensors, magnetic door sensors, etc. and/or any suitable switch depending on the application without departure from the scope of the present invention.

FIG. 8 illustrates a door transceiver/sensor device indicated generally at 326 operably mounted to the vehicle 314 monitoring when the door 328 is open. While the door 328 is shown open and a magnetic feature 320 out of contact with the door sensor element of the door transceiver/sensor device 326, it is understood that any suitable alternative sensor or monitoring of door open/closed status is contemplated depending on the application without departure from the scope of the present invention. The transmitting signal 324 is received by the receiver 332 operably connected to the vehicle. The acknowledgement signal 324 is received by the transceiver/sensor device 326. Alternatively, the transceiver/sensor device 326 is one or more devices that is/are a transmitter/receiver. It is also understood that the sensor can, alternatively, be a separately housed device from the transceiver/receiver or transmitter/receiver. Alternative locations for coupling the transceiver or transmitter/receiver or receiver (326 and 332) to the vehicle suitable for the transmit/acknowledge scheme are contemplated depending on the application without departure from the scope of the present invention. Preferably, the transmissions are wireless.

Figure 3:
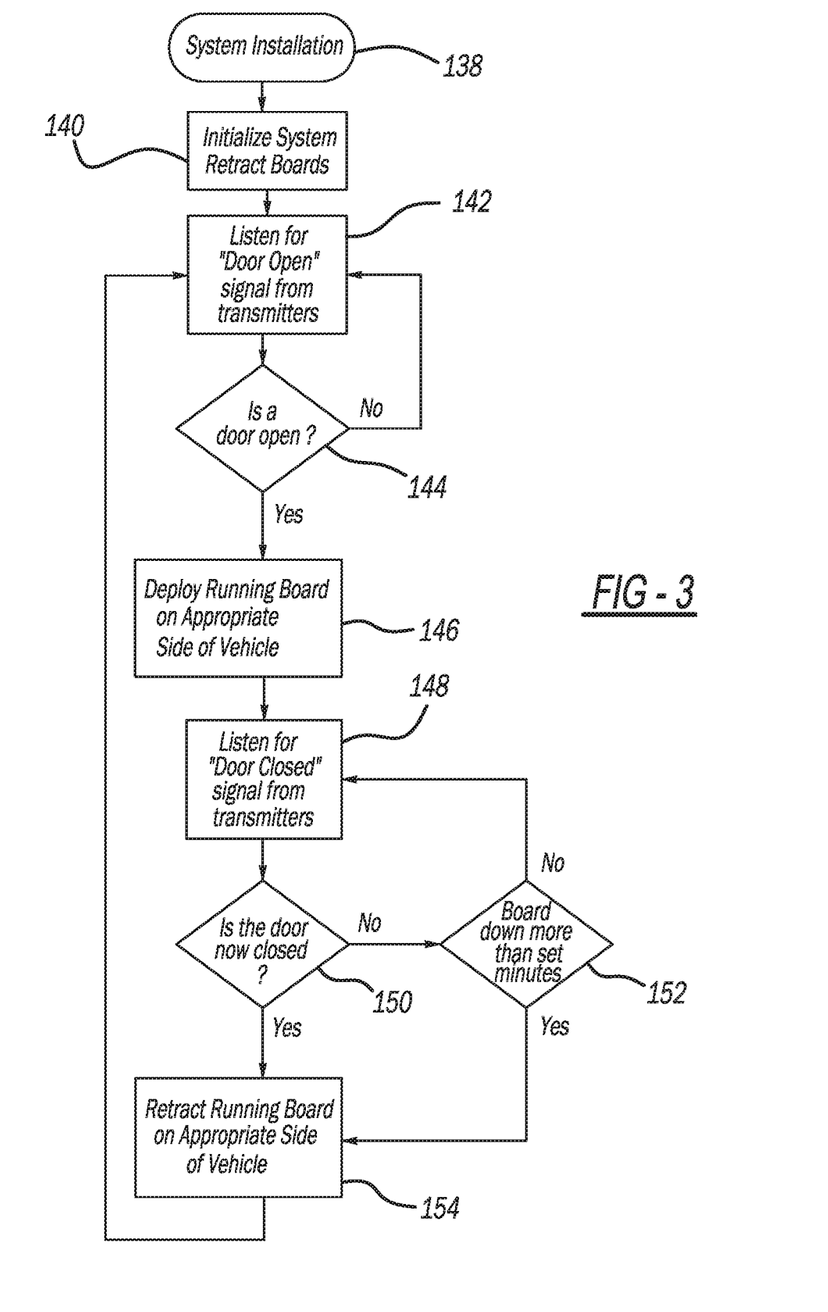
FIG. 3 is a flow chart depicting a power running board functional overview, in accordance with the present invention.

Referring now to FIGS. 2-6 generally, flow charts depict aspects of the present invention, including, utilizing transmit/acknowledge features. FIG. 3 generally depicts the basic operations of the control system 110 integrated with a power running board system, e.g., exemplary power running board system 310, according to the present invention. In general, system initialization pairs the transceivers with the corresponding running board/doors and defines which board to deploy. The boards are to be deployed no more than a predetermined amount of time, preferably, no more than 5 minutes, before automatic retraction. At least one running board assembly 310 is provided on both sides of the vehicle, which are raised to the retracted position out of the way when not in use.

Beginning system installation is indicated at 138. Initializing the system 140 retracts the boards 310. At least one transmitter is provided for operably signaling a change in a predetermined parameter, most preferably, a vehicle "door open" signal 324 to the receiver 332. Listening for "door open" signal from the transmitters is indicated at 142. The status of the door being open is determined 144. If the door is not open, the system continues listening for the "door open" signal from the transmitters 142. If the door is open, then the power running board 316 on the appropriate side(s) of the vehicle is/are deployed 146, e.g., transmitting a signal 324 and determining that the right side door(s) 328 is/are open will result in deploying the running board 316 on the right side of the vehicle 314.

Listening for "door closed" signal from the transmitters is indicated at 148. The status of the door being open is determined 150. If the door is not closed and the board 316 is not down for more than the predetermined amount of time, the system goes back to listening for the "door closed" signal from the transmitters 148. If the door is not closed 150 and if the board 316 has been down for more than the predetermined amount of time 152, e.g. 5 minutes, the running board on the appropriate side of the vehicle is retracted 154. If it is determined that the door is closed 150, the running board on the appropriate side of the vehicle is retracted 154. After retracing 154 the running board 316, the system goes back to the listening for a "door open" signal from the transmitters 142.

Figure 4:
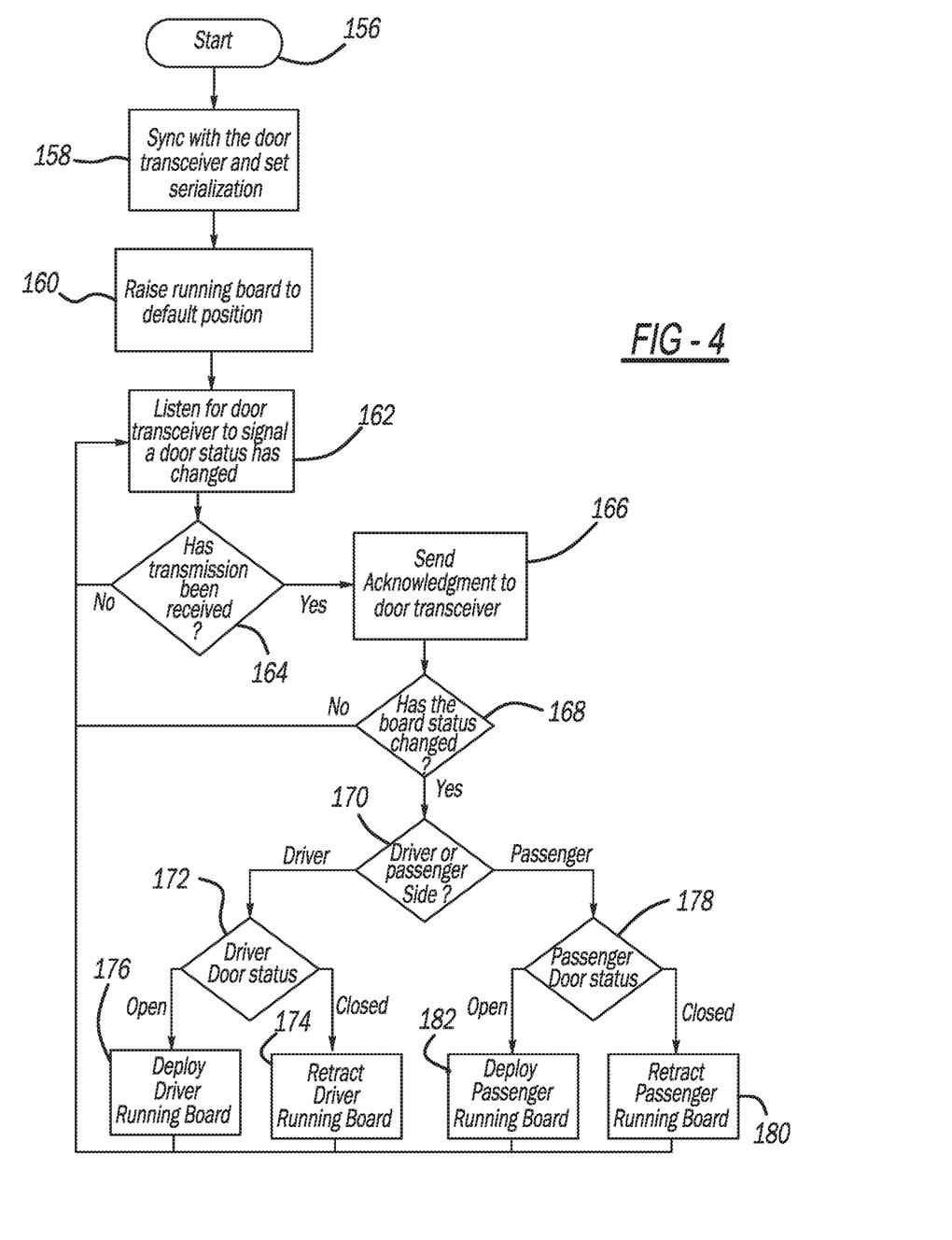
FIG. 4 is a flow chart depicting a power running board controller operations, in accordance with the present invention.

Referring more particularly to FIG. 4, the power board controller operation is started 156. Syncing with the door transceivers and set serialization is indicated 158. The running board 316 is then raised to the default position 160, e.g., default position being stowed, tucked up toward under the rocker panel, etc or any other suitable predetermined default position). The receiver listens for the door transceiver to signal a door status has changed 162. It is then determined whether or not the transmission has been received 164. If no transmission has been received, then the system goes back to listening for the door transceiver to signal a door status has changed 162. If a transmission has been received, an acknowledgement is sent to the door transceiver 166.

It is then determined whether or not the running board 316 status has changed 168. If not, the system goes back to listening for the door transceiver to signal a door status has changed 162. If the running board status has changed, then it is determined whether it is the driver side or the passenger side 170. The driver door status 172 is determined, and if the door is closed, the driver side running board 316 is retracted 174, and if the door is open, the driver side running board 316 is deployed 176. The passenger door status 178 is determined, and if the passenger door is closed, the passenger side running board 316 is retracted 180, and if the door is open, the driver side running board 316 is deployed 182. It is understood that the driver and passenger doors are front and/or rear passenger doors of the vehicle.

The door transceiver transmits the signal to the controller (controller receiver) when door status changes. Once it is determined that the door transceiver transmission has been received by the controller, an acknowledgement is sent by the controller to the door transceiver. This transmission/acknowledgment design significantly reduces the drain on battery life. The driver/passenger side running board is deployed/retracted based on the respective door status open/closed. When the deploy/retract cycle is completed, the controller listens for the door transceiver to signal a door status has changed.

Figure 5:
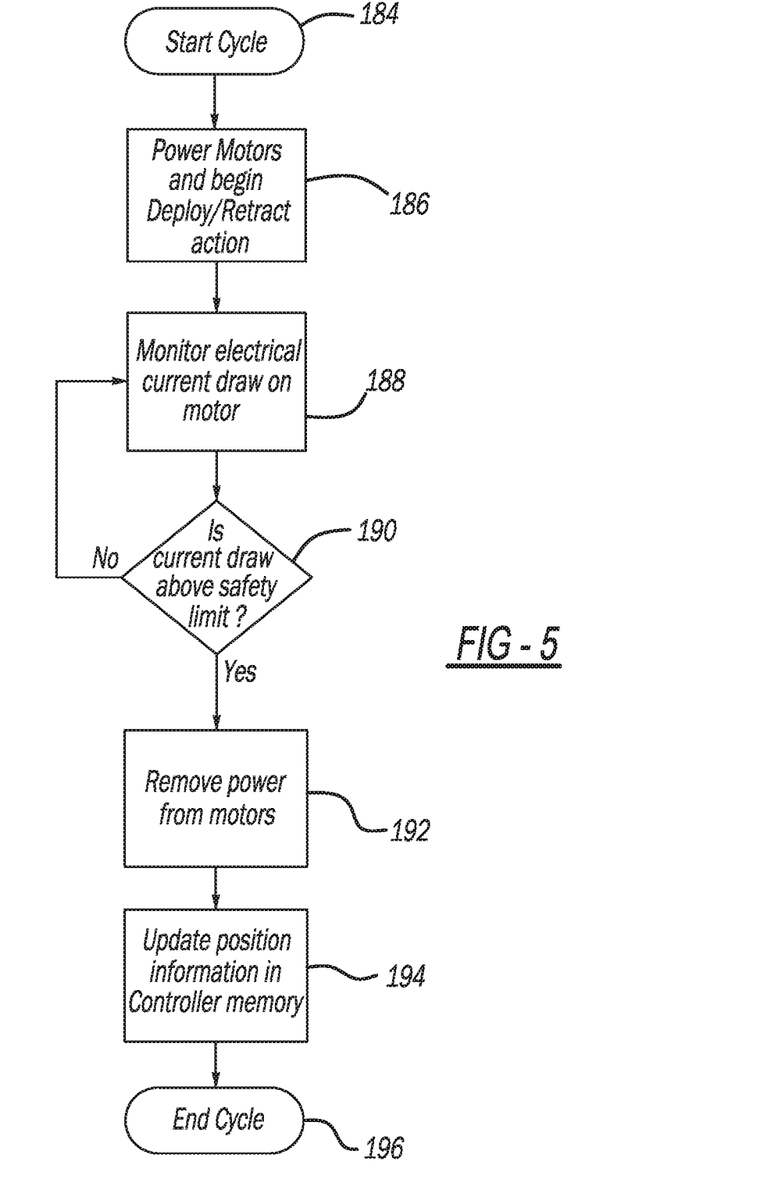
FIG. 5 is a flow chart depicting a power running board deployment/retraction and safety control sequence, in accordance with the present invention.

Referring more particularly to FIG. 5, while the running board 316 is in motion, the motor current draw is monitored. If the board comes into contact with an object it needs to stop with a safe amount of pressure. The current determines the torque exerted by the motors 312 and subsequently the pressure against the object in contact. Characterizing each linkage design allows the correlation of force to current. Once the unsafe level of current is reached the running boards 316 will stop to avoid user harm and harm to the running board system 316. Position information in the memory of an operably coupled controller 334 is also updated. Preferably, the controller 334 is in communication with the motor 312 and/or receiver 332 and/or transceiver 326, most preferably, wireless communication.

The power board deploy/retract and safety control sequence is started 184. At least one of the motors 312 is powered and the deploy/retract action is begun 186. The electrical current draw on the motor is monitored 188. If the current draw is not above a predetermined safety limit 190, then the system continues to monitor the electrical current draw. If the current draw is above a predetermined safety limit 190, then the application of power is removed from the motors 192. Position information is updated in the controller memory 194 and the cycle ends 196.

Figure 6:
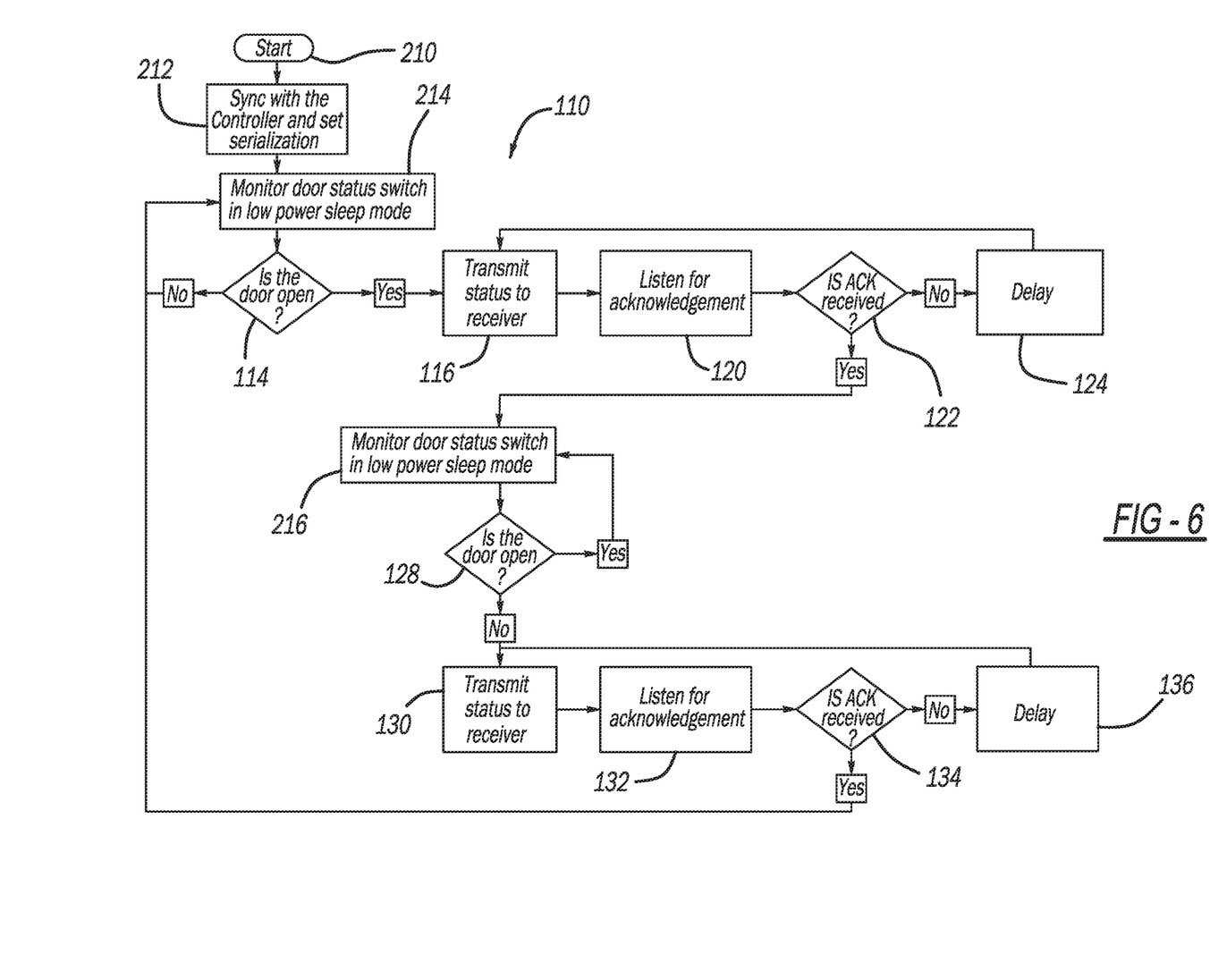
FIG. 6 is a flow chart depicting a power board door transceiver communications system using the transmission/acknowledgement scheme, in accordance with the present invention.

Referring more particularly to FIG. 6, FIG. 6 is substantially identical to FIG. 1, except that the sync with the controller and set sterilization is utilized and monitoring of the door status switch is in low power sleep mode. The power board door transceiver operation is started 210. Sync with the door transceivers and set serialization 212, e.g., the door transceivers are synced with the controller at 212. The door status switch is monitored in low power sleep mode 214. The status of the door being open is determined 114. If at least one door is open, the door status is transmitted to the receiver 116. If it is determined that at least one door is not open, the door status switch is monitored in low power sleep mode 214.

After transmitting door status to the receiver 116 (e.g., receiver 332 of FIG. 7), the system listens for acknowledgement at 120 back. The status of the acknowledgement being received is determined 122. If acknowledgment is not received, there is a predetermined delay time 124, e.g., about 150 m/s, before transmitting door status to the receiver 116 again.

If acknowledgement is received, the door status switch is monitored in low power sleep mode 216. The status of the door being open is determined 128. If open, then the door status switch is monitored in low power sleep mode 216. If not open, the door status is transmitted to the receiver 130.

After transmitting door status to the receiver 130, the system listens for acknowledgement at 132 back. The status of the acknowledgement being received is determined 134. If acknowledgment is not received, there is a predetermined delay time 136, e.g., about 150 m/s, before transmitting door status to the receiver 130 again. If acknowledgement is received the door status switch is monitored at low power sleep mode 214.

Referring to the door transceiver communications generally, the door transceiver is powered by coin cell batteries with a limited life. Using a transmission/acknowledgment (ACK) scheme the door transceivers do not need to transmit an "I'm Alive/Open" signal continuously for the entire time the vehicle door is open. Constant transmission of redundant status information is a waste of battery power and it provides no additional functionality. The transmit/acknowledge scheme removes the constant drain on the batteries by redundant transmissions.

Generally, the delay time is about less than about 175 milliseconds, typically, about 100 to 200 milliseconds, preferably, about 115 to 175 milliseconds, more preferably, 135 to 165 milliseconds, most preferably, about 150 milliseconds.

Generally, the signals are at a wireless frequency of about 400 to 1100 MHz, typically, about 500-1050 MHz, preferably, less than about 930 MHz, most preferably, less than 915 MHz. Alternative radio frequencies are contemplated depending on the application without departure from the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A control system for a power running board assembly for vehicles, comprising:
    at least one door transceiver operable to monitor a respective vehicle door status switch and transmit a signal when door status changes;
    at least one battery powering said at least one door transceiver;
    at least one receiver operable to receive said signal and send an acknowledgement to said at least one door transceiver that said signal is received, wherein a redundant transmission of vehicle door status is not sent after said acknowledgement is received by said at least one door transceiver; and
    wherein another signal is transmitted by said at least one door transceiver when vehicle door status changes to save battery power.

2. The control system of claim 1, wherein said door status switch is monitored in a low power sleep mode.

3. The control system of claim 1, wherein said at least one battery is a coin cell battery and said transmit/acknowledgment prevents constant drain on said at least one battery.

4. The control system of claim 1, wherein redundant transmissions are not used.

5. The control system of claim 1, wherein said at least one door transceiver monitors said vehicle door status switch and transmits said signal to said receiver when a vehicle door is open.

6. The control system of claim 5, wherein said at least one door transceiver does not re-transmit said signal the entire time said door is open once said acknowledgment is received.

7. The control system of claim 5, wherein if said acknowledgement is not received by said transceiver, re-transmitting of said signal is delayed a predetermined amount of time.

8. The control system of claim 1, wherein said at least one door transceiver monitors said vehicle door status switch and transmits said signal to said receiver when a vehicle door is closed.

9. The control system of claim 1, wherein the door status change is open door or closed door.

10. The control system of claim 1, wherein the control system is a radio frequency control system using wireless signals.

11. The control system of claim 1, further comprising a retractable power running board, wherein said retractable power running board is automatically retracted if said receiver does not receive another signal from said transceiver after a predetermined period of time.

12. The control system of claim 1, further comprising at least one power running board assembly operably mounted to a driver side and a passenger side of said vehicle, wherein said control system deploys a running board of said power running board assembly on the driver or passenger side when a vehicle door on that same side is open, and wherein said control system retracts a running board of said power running board assembly on the driver or passenger side when a vehicle door on that same side of said vehicle is closed.

13. The control system of claim 12, further comprising at least one sensor operably coupled to said vehicle adjacent a driver side door and passenger side door to detect said door status change of either of said driver side or passenger side doors.

14. The control system of claim 12, further comprising at least one motor on each of said power running board assemblies to deploy/retract said running board depending on said monitored door status change.

15. The control system of claim 14, further comprising at least one drive link operably coupled to the vehicle and driven by said at least one motor, and at least one idler link operably coupled to the vehicle and caused to deploy/retract by at least one torsion bar operably coupled to said at least one drive link and at least one idler link.

16. The control system of claim 14, wherein motor current draw is operably monitored to determine how much torque to be exerted by said at least one motor when said running board is being deployed or retracted.

17. The control system of claim 16, wherein power is removed from said at least one motor when said motor current draw is above a predetermined limit to provide object detection and stop deployment/retraction of said running board.

18. A process for deploying and retracting a power running board assembly for vehicles, comprising:

providing at least one door transceiver operable to monitor vehicle door status and transmit a signal when door status open/closed changes;

providing a receiver operable to receive the door transceiver signal and send an acknowledgement to the door transceiver;

providing at least one linkage assembly operably connected to the vehicle and including a retractable running board that extends to be a step and retracts for stowage depending on the transceiver's signal of door status changes;

transmitting a signal from the door transceiver to the receiver when door status changes;

sending an acknowledgement signal of receipt of the door transceiver's signal back to the door transceiver;

energizing a motor of the power running board assembly to extend or retract the running board depending on the door status change signal.

19. The process of claim 18, further comprising a safety control sequence including removing power to the motor when there is a current spike to stop extend/retract motion of the running board assembly.

20. A control system integrated with a power running board assembly for vehicles, comprising:

at least one door transceiver operable to monitor a respective vehicle door status switch in a low power sleep mode and to transmit a wireless signal when door status changes;

at least one battery powering said at least one door transceiver;

at least one receiver operable to receive said signal and send an acknowledgement wireless signal to said at least one door transceiver that said wireless signal was received;

at least one deployable/retractable running board operably coupled to at least one first link and at least one second link; and at least one motor operably coupled to at least one of said first and second links to deploy/retract said first and second links to cause said running board to extend and retract between a deployed position and a retracted position;

wherein another signal is transmitted by said at least one door transceiver only when vehicle door status changes to save battery power, or, if said acknowledgement signal is not received by said at least one door transceiver, wherein if said acknowledgement signal is not received by said transceiver, the signal from the door transceiver is re-transmitted to said receiver after a delay of about 100 to 200 milliseconds.

\* \* \* \* \*